(No Model.) 4 Sheets—Sheet 1.

F. H. RICHARDS.
WEIGHING MACHINE.

No. 589,273. Patented Aug. 31, 1897.

Witnesses
Chas. F. Schmelz
Fred J. Dole

Inventor
F. H. Richards (No Model.)

4 Sheets—Sheet 3.

F. H. RICHARDS.
WEIGHING MACHINE.

No. 589,273.

Patented Aug. 31, 1897.

Witnesses
Chas. L. Schmitz
Fred. J. Dole.

Inventor
F. H. Richards.

(No Model.) 4 Sheets—Sheet 4.
F. H. RICHARDS.
WEIGHING MACHINE.
No. 589,273. Patented Aug. 31, 1897.
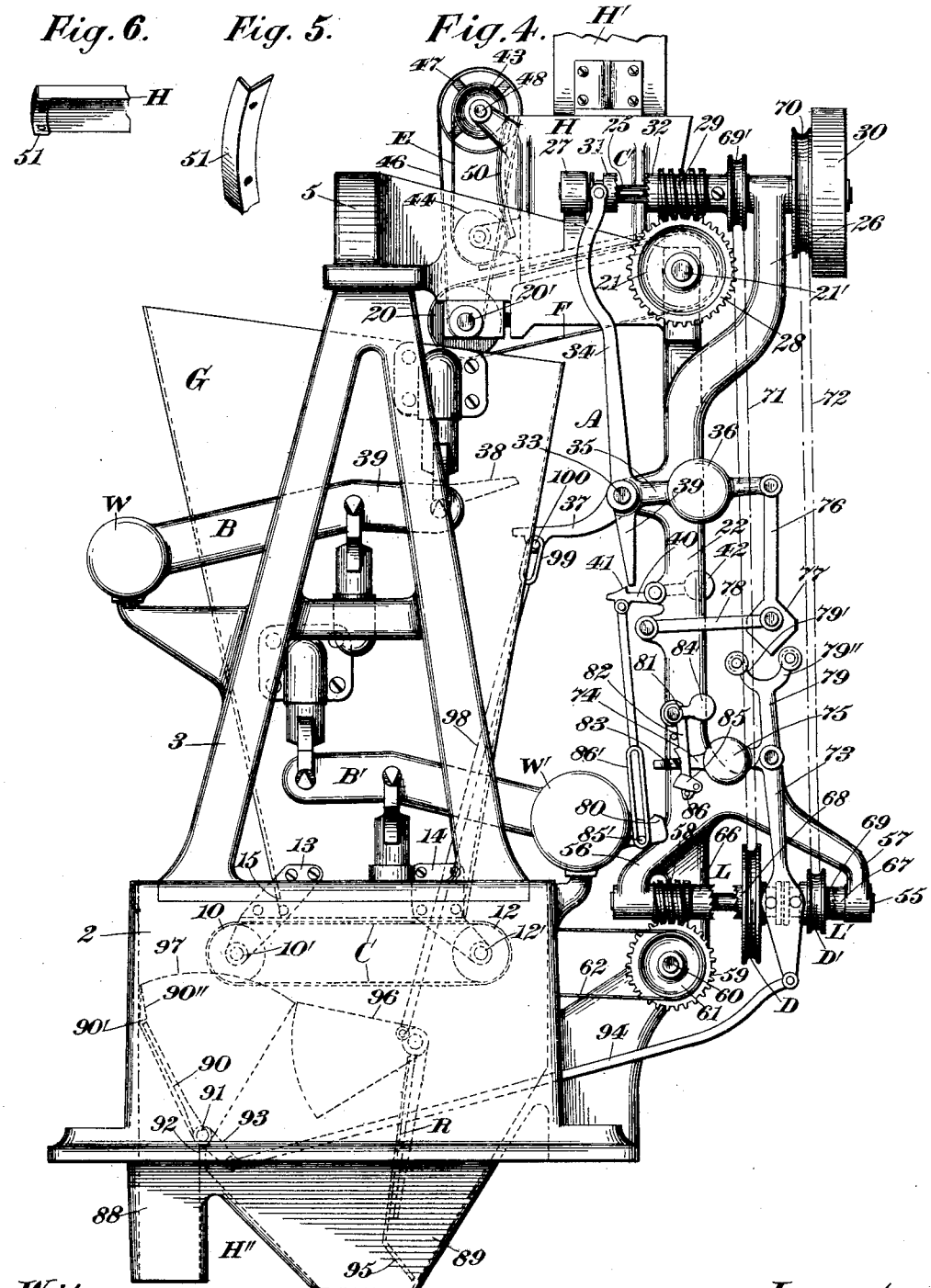
Witnesses
Chas. T. Schmelz
Fred. J. Dole.
Inventor
F. H. Richards

United States Patent Office.

FRANCIS H. RICHARDS, OF HARTFORD, CONNECTICUT.

WEIGHING-MACHINE.

SPECIFICATION forming part of Letters Patent No. 589,273, dated August 31, 1897.

Application filed March 10, 1897. Serial No. 626,760. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various kinds of granular and similar material, more particularly sluggish substances, in large lots, certain of the improvements being especially adapted for application to machines of the kind disclosed by Letters Patent No. 572,067, granted to me November 24, 1896.

With respect to one of its objects the invention comprehends the provision of improved feeding or supply means, including a carrier and a transversely-disposed endless agitator, said parts in the present case consisting of endless belts, the endless belt which constitutes the carrier having material delivered thereto which it conveys to the load-receiver of the weighing mechanism, the endless agitator or belt being preferably situated at a point near the delivery end of the carrier and adjacent to the mass thereon, so that by its action it will impart to the material supported on the carrier a peculiar rolling action to thereby disintegrate and loosen up the same to assure its free passage to the load-receiver.

Another object of the invention is to provide, in connection with the load-receiver, a conveyer, which is preferably mounted thereon, said conveyer serving two purposes, first, for removing from the load-receiver a certain quantity of material which had previously been supplied thereto to poise the load or bring it to a definite standard or true load, and, second, to remove or conduct from the load-receiver said load, it being evident that the conveyer is a combined load-reducing and load-discharging device, and suitable instrumentalities will be furnished to operate said conveyer to accomplish the foregoing results in regular order.

Figure 1:
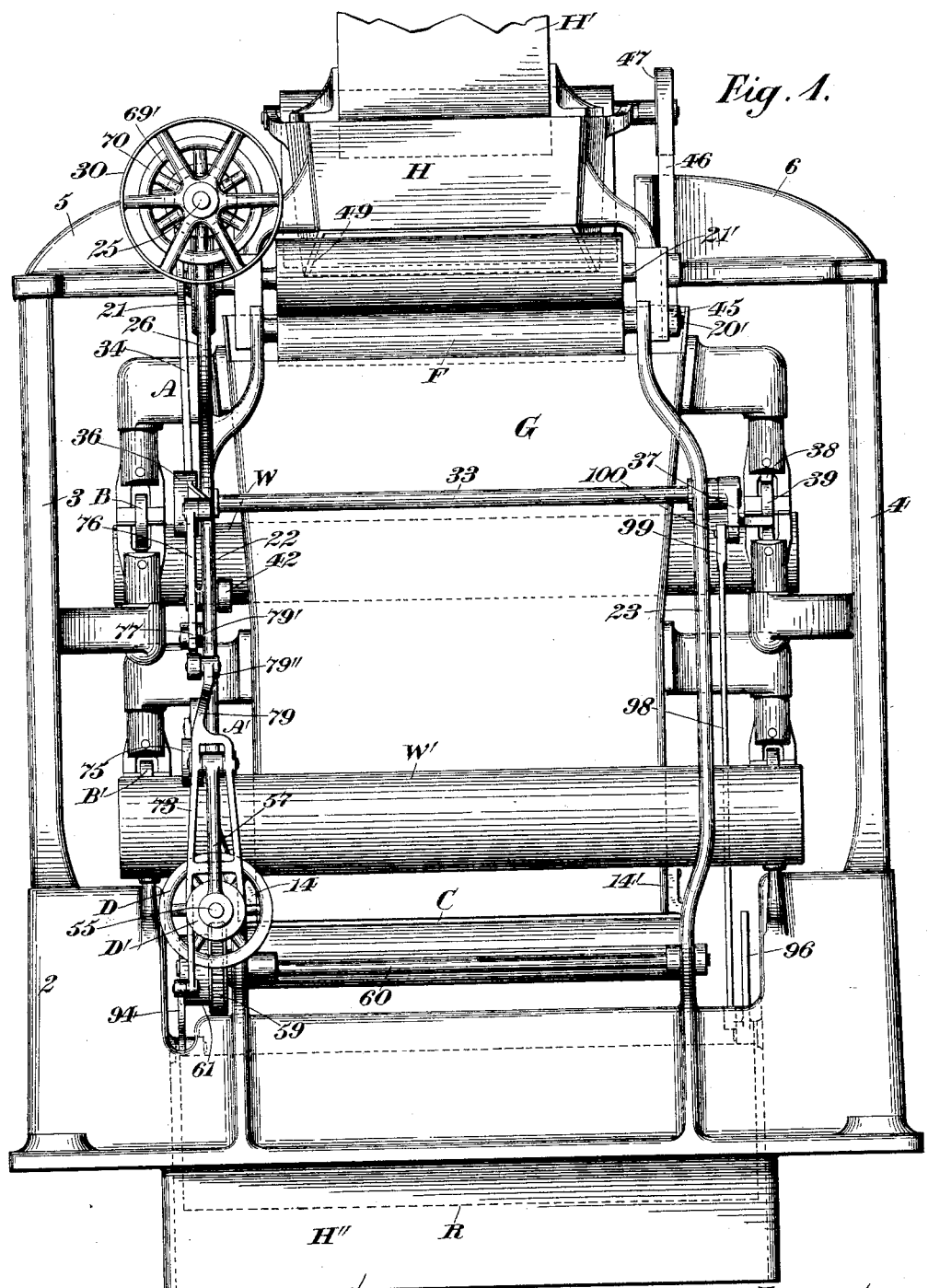
Figure 2:
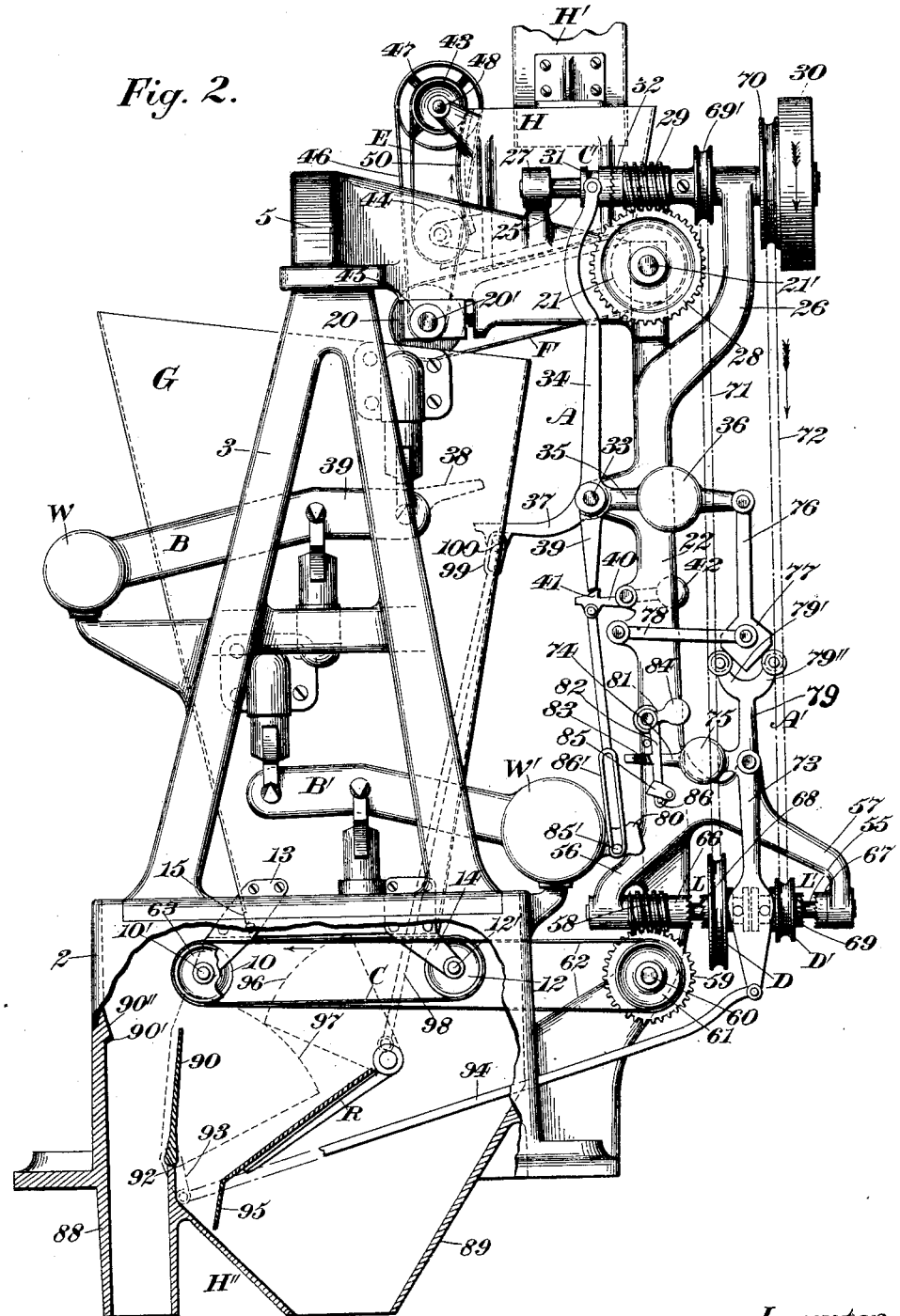
Figure 3:
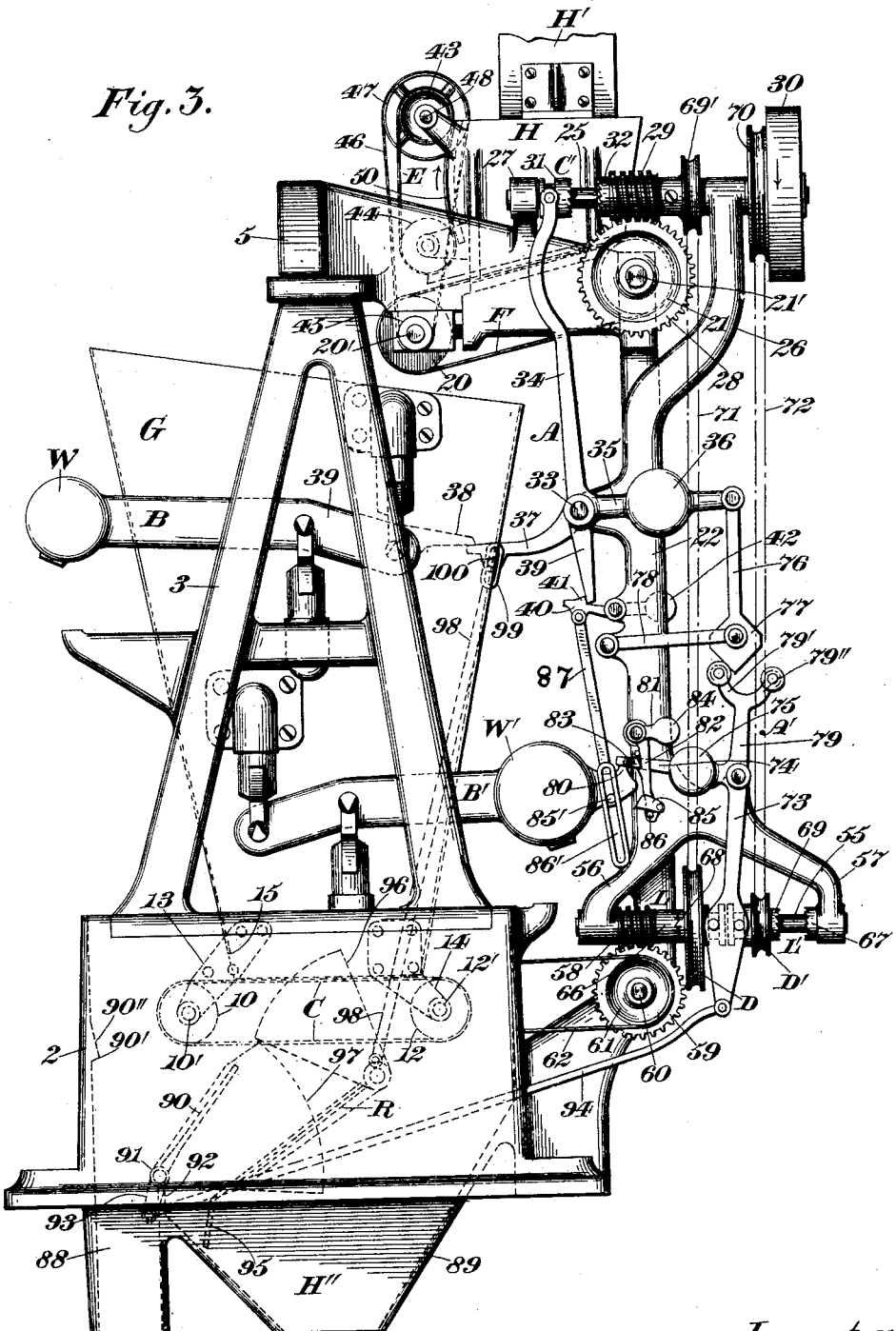

In the drawings accompanying and forming part of this specification, Figure 1 is a rear elevation of a weighing-machine embodying my present improvements. Figs. 2, 3, and 4 are end elevations of the machine, as seen from the left in Fig. 1, and show the same in three successive positions during the making and discharging of a load. Figs. 5 and 6 are detail views, hereinafter more particularly described.

Similar characters designate like parts in all the figures of the drawings.

The framework for supporting the different sets of mechanisms may be of any suitable or preferred character, it comprising in the present case the supporting base or bed 2, the end frames 3 and 4, which are mounted on and secured to said base, and the angular brackets 5 and 6, which are attached to said end frames, said brackets constituting a convenient means for supporting certain of the members of the supply apparatus.

The weighing mechanism includes a suitable load-receiver, as G, and supporting-beam mechanism, the latter including suitable scale-beams, as B and B', respectively, situated above and below the center of gravity of the load-receiver G, whereby the tendency of said load-receiver to unduly oscillate during its operation is reduced, and said beams are represented oppositely disposed. The two beams in the present case are similar in construction, and, as in the Letters Patent hereinbefore referred to, they consist of a pair of longitudinal arms joined at one end by a combined counterweight and connecting-shaft. The counterweight for the beam B is designated by W and the counterweight for the beam B' is designated by W'. The beam B' is represented fulcrumed or pivotally supported upon the base or bed 2, it being furnished at its inner end with suitable supports for the load-receiver, and the beam B is similarly mounted upon suitable brackets extending inward from the frame members 3 and 4, respectively, it, like its mate, being furnished with supports for the load-receiver.

Hereinafter when the descending movement or stroke of the beam mechanism is mentioned it is to be understood that I refer to that part of the two beams between the fulcrums and the supports for the load-receiver, it being understood that such portions on the beam move in coincidence with the load-receiver. The load-receiver G has in its bottom an outlet, and the same is covered in the present case by a conveyer, which, when at rest, effectively prevents the passage of material through the load-receiver. The conveyer may be of any positively-actuated type which operates to forcibly remove any part of the contents of the load-receiver; but I have herein represented the same consisting of an endless belt C, carried around the supporting-rolls 10 and 12, situated at the front and rear, respectively, of the load-receiver. The shaft 10' of the roll 10 is carried by supporting-brackets at each end of the load-receiver, one of said brackets being shown at 13, the shaft 12' being borne by a similar pair of brackets, as 14 and 14', respectively, at the rear of the load-receiver. The upper run of the conveyer or carrier C will be adjacent to the lower edge of the load-receiver, the effective movement of said conveyer being represented by the arrow in Fig. 2, it being adapted to conduct material through the narrow discharge-outlet 15 at the front lower side of the load-receiver when in motion.

The driving mechanism for actuating the conveyer or belt C, whereby it is adapted to serve its double purpose, will be hereinafter described.

My present invention comprehends as a part thereof overloading and load-reducing means, preferably automatically operative in this order during the weighing of a load, the overloading means being intended to deliver to the load-receiver of the weighing mechanism a mass or supply of material in excess of that determined upon for a true load, the surplus being subsequently withdrawn by the load-reducing means, and the conveyer C constitutes a convenient device for removing the surplus from the load-receiver, as will hereinafter appear. The overloading or supply means embodies a carrier or feeder, which may be of any suitable character, it being herein represented as an endless belt F, supported for movement below the supply hopper or case H, the latter being preferably secured to the angular brackets 5 and 6. The feed carrier or belt F is passed around the supporting rolls or drums 20 and 21, the shaft 20' of the roll 20 being carried by the usual adjustable journal-blocks on the framing of the machine, while the shaft 21' of the rear roll is sustained by the standards 22 and 23, which are fixed, respectively, to the base or bed 2 and the brackets 5 and 6 at opposite ends of the machine. The feed carrier or belt F is disposed at a slight inclination, its delivery end being situated over the upper open end of the load-receiver to supply the latter with material to constitute the load, the direction of movement of the belt being indicated by the arrow in Fig. 2.

The driving mechanism for the feed-carrier F includes as a part thereof a shaft connected with said carrier by suitable means. Said shaft is designated by 25, and it is sustained by the upright 26 on the standard 22 and a suitable bearing-arm, as 27, on the bracket 5.

The rear shaft 21' of the carrier F has suitably fixed thereto the worm-gear 28, which meshes with and is intermittently driven by a worm, as 29, which is loosely carried by the power-shaft 25, said worm being clutched or coupled to the shaft 25 at predetermined intervals, whereby the carrier F can be advanced to conduct from the hopper H a supply of material, which it delivers in the form of a stream of comparatively large volume to the load-receiver G.

The shaft 25 is represented as having secured thereto at its outer end the pulley 30, the direction of rotation of which is indicated by the arrow, so that when the pulley is rotated the worm 29, having previously been thrown into action relatively to the carrier, the latter will be operated to advance the supply of material from the hopper H to the load-receiver, as will be readily apparent. In practice the pulley 30 will be connected by belting to a suitable motor, (not shown,) or some other form of driver can be substituted for the pulley 30. For the purpose of throwing the worm 29 into effective relation with the shaft 25, and consequently the carrier F, I have illustrated a clutch C' of ordinary construction, it forming part of the carrier-driving mechanism and consisting of two members or sleeves 31 and 32, the last mentioned being conveniently formed integral with the worm 29, which is loose on said shaft, the slidable clutch member 31 being longitudinally reciprocatory on and suitably keyed to the power-shaft 25, the adjacent or engaging faces of said clutch members being serrated.

The actuator for the clutch member 31 is designated by A, it consisting of a compound lever affixed to the transverse rock-shaft 33, which is journaled in suitable lugs or ears on the standards 22 and 23, respectively. The upright arm 34 of the clutch-actuator A is furnished with a pin, which is set within a groove or channel in the slidable clutch member 31 in the ordinary manner. The clutch-actuator is self-operative in one direction, the arm 35 thereof being furnished with the weight 36, which is normally operative to throw the clutch member 31 into engagement with its companion 32 and to maintain said parts in this relation, the disengagement of these parts being effected by the weighing mechanism, or, preferably, by one of the beams thereof, acting through the intermediate actuator or lever A. The actuator A has a third radial arm 37, which is disposed in the path of movement of the projection or finger 38 on the arm 39 of the upper scale-beam B, so that when the weighing mechanism has descended a short distance below the so-called "poising-line," with the overload or with a quantity of material therein in excess of that determined upon for a true charge, the projection 38 will impinge against the actuator-arm 37 to depress the same, as represented in Fig. 3, thereby oppositely to swing the actuator-arm 34, whereby the clutch member 31 will be moved along its supporting-shaft and disengaged from the fixed clutch member 32, so that the carrier F, and consequently the supply of material to the load-receiver, will be promptly stopped. To hold the parts in their said shifted positions, a suitable detent is preferably provided, which is adapted to engage an arm, as 39, of the actuator A. The detent for this purpose is represented at 40, it consisting of a counterweighted latch pivoted to the standard 22, and having a catch 41, which is adapted to engage the arm 39 of the actuator when the latter is shifted as just specified, the counterweight 42 preferably furnishing the power to swing the working arm of the latch upward into engagement with said actuator-arm.

In connection with the carrier I provide an agitator, it consisting of an endless belt preferably transversely disposed relatively to said carrier and situated adjacent to the delivery end thereof, the inner run of said endless agitator, which is designated by E, also forming the front wall of the supply-hopper H. The endless agitator or belt E is carried by rolls, as 43 and 44, the shafts of which are journaled in bearings extending forward from the hopper H. The direction of movement of the endless agitator or belt E is represented by the arrow in Fig. 3, and on its action it will impart to the adjacent mass, near the delivery end of the feed carrier or belt F, a peculiar rolling action to disintegrate the same, whereby its free and unobstructed passage to the load-receiver will be insured.

As a convenient means for driving the endless agitator or belt E, I connect the same with the feed-carrier F. The shaft 20' of the forward roll 20 of said feed-carrier has fixed thereto at one end the small pulley 45, which is connected by the belt 46 to the pulley 47 on the shaft 48 of the upper roll 43 of the endless agitator, so that when the carrier F is operated the endless agitator E will be simultaneously driven.

For the purpose of facilitating the loosening up of the material at the delivery end of the hopper the mouth thereof will be flared or widened, as at 49, (see Fig. 1,) so that the mass cannot pack at this particular point.

The hopper H in practice will be supplied with material by suitable means, as the conduit H', which is set on and secured to said hopper and which communicates with a suitable source of supply.

It will be remembered that the endless agitator or belt E, or the inside run thereof, constitutes the front wall of the feed hopper or case H, and for the purpose of preventing escape of material between said endless agitator and the feed-hopper I prefer to run the former in contact with the latter, or with a suitable antifriction plate or plates, such as 50 and 51, thereon, the latter being of smooth sheet metal and being secured to the front edges of the opposite end walls of the feed-hopper.

In Fig. 5 I have represented in detail the antifriction-plate 50 and in Fig. 6 a portion of one of the end walls of the feed-hopper with said plate in position thereon. The two plates are the same in construction and are substantially L-shaped in transverse section, one of the parts thereof being curved and fitting snugly against the correspondingly-shaped portion of the front edge of the feed-hopper, as shown in Figs. 2, 3, and 4.

As hereinbefore stated, my present invention, like the Letters Patent referred to herein, includes overloading and load-reducing means, preferably successively operative.

The carrier F constitutes an overloading device for conducting to the load-receiver from the hopper H a mass of material in excess of that determined upon for a true charge, the conveyer C, which is mounted on the load-receiver, acting, when properly driven, to remove and to deliver into a suitable receiver the surplus, the residue, or remainder in the load-receiver constituting the true load, which is also removed by said conveyer—that is to say, the said conveyer has two successive periods of action and an intervening stage of rest, a pair of successively-effective and independently-operative drivers being preferably employed to operate said conveyer to effect the peculiar results, said drivers being thrown into action or operative relation with the conveyer at predetermined points in the operation of the machine and by means controlled by the weighing mechanism, as will hereinafter appear.

A driving-shaft is represented at 55, supported for rotation by the hangers 56 and 57 on the standard 22, said shaft having near its inner end the worm 58, which is fixed thereon and which meshes with a worm-gear 59, the shaft 60 of which is also supported by the standard 22. The shaft 60 has fixed thereto the pulley 61, which is connected by the belt 62 with a pulley 63 on the forward shaft 10' of the conveyer C.

The conveyer C is preferably driven at two different speeds, it being operated at its low or slow speed during the load-reducing period, whereby the load can be poised with great accuracy, and being driven at its high speed on the completion of the weighing operation to thereby conduct the true load from the load-receiver with rapidity.

The two drivers for the conveyer C are designated by D and D', respectively, and they are herein represented as consisting of large and small pulleys, respectively, loosely carried by the driving-shaft 55, said pulleys being successively coupled to said shaft through the intervention of suitable clutches, as L and L', respectively, the two pulleys being preferably made integral with the slidable members of the two clutches.

The fixed member of the clutch L is designated by 66, it forming a part of the worm 58, the fixed member of the clutch L' being designated by 67 and being suitably secured to the shaft 55. The slidable members of the two clutches are designated by 68 and 69, respectively, and as hereinbefore stated they have the drivers or pulleys D and D' cast therewith.

The main shaft 25, to which I have hereinbefore referred, has fixed thereto the pulleys 69' and 70, which are connected by the belts 71 and 72 with the pulleys or drivers D and D', respectively, said belts being represented only in Fig. 2 and by dotted lines. The small pulley 69' is connected with the large pulley D by the belt 71, and it will be evident that when said pulley D is coupled to its supporting-shaft 55 and the shaft 25 is rotated the conveyer C will be driven at a relatively low speed, and that when said pulley D is uncoupled from its shaft and the pulley D' is coupled thereto the conveyer C is driven at a relatively high rate of speed.

For successively coupling the pulleys D and D' to their supporting-shaft I provide an actuator, as A', which is adapted to operate both slidable members of the two clutches, said actuator being self-operative in one direction, as will hereinafter appear. The actuator A' is in the form of a compound lever supported by the hanger 57, the downwardly-projecting part 73 thereof having two arms which are each furnished with two projecting pins which enter peripheral channels or grooves on the independently-operative slidable clutch members 68 and 69, respectively, in the ordinary manner.

The arm 74 of the clutch-actuator A' is furnished with a weight, as 75, or equivalent device, which normally tends to throw the slidable clutch member 69 into engagement with the fixed clutch member 67, this action, however, being preferably limited or restrained during the action of the carrier F by means operative with the latter, such as the stop 76, which consists of a pendent bar pivotally hung from the counterweighted arm 35 of the actuator A', the head 77 of said bar being of wedge or arrow shape and being connected with the framing of the machine by the link 78, which restricts oscillatory movement of the stop or bar 76. The upper end of the upright or vertical arm 79 of the clutch-actuator is bifurcated, the respective branches being designated by 79' and 79", said bifurcation being coöperative with the head of the stop or bar 76.

During the normal action of the machine or when the carrier F is conducting the supply to the load-receiver G the wedge-shaped head of the stop or bar 76 will be between the branches 79' and 79" of the actuator-arm 79, and the oppositely inclined or oblique faces thereof will be in contact with said branches or with antifriction-rolls thereon, so that the pendent bar 76 being held against oscillation by the link 78 said bar 76 is adapted also to hold the actuator A' against lateral movement.

When the projection or finger 38 on the scale-beam B has impinged against and lowered the actuator-arm 37, the arm 34 will be swung to the left, as shown in Fig. 3, thereby disengaging the slidable clutch member 31 of the fixed clutch member 32, and during this operation the counterweighted arm 35, and consequently the pendent bar 76, will be elevated, whereby the actuator A' will be released and can be swung in either direction, it being understood that the operation just described takes place at about the time the weighing mechanism has passed below the poising-line with the overload.

For the purpose of swinging the lower arm 73 of the clutch-actuator A' to the left, thereby to throw the slidable clutch member 68 into engagement with the fixed clutch member 66, whereby the load reducer or conveyer C can be started, I prefer to employ a device operative with the scale-beam B'. The weight W' of the beam B' has at a suitable point thereon the projection or lug 80, which, as the load-receiver descends, rises simultaneously therewith, and when the load-receiver has been overpoised said projection or lug 80 is adapted to abut against and elevate the arm 74 of the actuator A', thereby swinging the actuator-arm 73 to the left and coupling the clutch member 68 to the clutch member 66, whereby the conveyer C will be driven at a comparatively low rate of speed to conduct from the load-receiver through the outlet 15 a body of material which is delivered into a suitable receiver.

When the clutch member 68 has been coupled to its mate 66, as represented in Fig. 3, the actuator A' will be locked momentarily against return movement, although the weight W' is free to fall away from the actuator-arm 74. The latch for this purpose is represented at 81, it being pivoted on the standard 22 and having a notched arm 82, the notch of which is adapted to engage the coöperating shoulder 83 on the actuator-arm 74, this operation being effected by the counterweight 84.

The notched latch-arm 82 has pivoted thereto near its lower end the by-pass 85, the action of which is limited by the pin 86 on said arm. As the weight W' rises in the manner previously described, and when it has nearly reached the end of its ascending stroke, the projection 80 thereof will engage and lift the by-pass 85 without affecting the latch 81. When, however, the load-receiver is lightened by the removal of the surplus material therefrom, said weight W' will drop and will fall away from the arm 74, and at about the time the load-receiver has reached the poising-line with the predetermined charge the projection 80 will abut against the by-pass 85 and will force the latch-arm 82 to the right and will disengage the notch thereof from the shoulder 83 of the actuator-arm 74, so that the weight 75 can drop, thereby swinging the actuator-arm 73 to the right, which results in disengaging the clutch member 68 from its companion 66 to momentarily stop the conveyer C, a true load being in the load-receiver at this time. The weight 75 will continue to fall, thereby carrying the arm 73 farther to the right, so that the clutch member 69 can be coupled to the clutch member 67, the conveyer C thereby being thrown into action for removing the true load or charge from the load-receiver G.

It will be remembered that on the shifting of the actuator A' by the scale-beam B it is engaged by a detent or latch 40, as indicated in Fig. 3, whereby the carrier F can be maintained in its ineffective position during the load-reducing and load-discharging periods, respectively. For the purpose of disengaging these parts on the discharge of the load I prefer to employ a tripping device coöperative with the beam B', such as the pin 85 thereon. This pin reciprocates within the longitudinal loop 86' of the link 87, the latter being pivoted to the working arm of the latch 40. By reason of the loose connection of the link 87 with the beam B' the latch 40 is rendered immediately effective on the ascent of the weight W, so that it can engage the actuator-arm 39 at the proper stage in the operation of the machine. When, however, the weight W' descends and has almost reached its normal position, it will strike the lower end of the loop 86', thereby pulling down the link 87, and consequently depressing the working arm of the latch 40, whereby the actuator A is released and can be returned to its normal position by the dropping of the counterweight 36, which results in throwing the clutch member 31 into engagement with its companion 32 to thereby start the carrier F.

For the purpose of preventing the engagement of the respective clutches that are coöperative with the conveyer C and form a part of the driving mechanism thereof a clutch-centering device for throwing said clutches or the movable members thereof to their ineffective positions is provided. The pendent bar 76, which I have hereinbefore described, constitutes such a clutch-centering device, and the operation thereof will be understood from an inspection of Fig. 2 of the drawings. When the weighted arm 35 of the clutch-actuator A drops in the manner just specified, the pendent bar or centering device 76 will be forced downward and the right-hand oblique face of its wedge-shaped head 77 will be caused to ride against the right-hand branch 79'' of the actuator-arm 79, thereby swinging said arm to the right and oppositely swinging the arm 73, this action continuing until the opposite oblique face of the head 77 has reached the other branch 79' of the arm 79, at which time the two clutch members L and L' will have reached their ineffective positions and the clutch member 31 having in the interval been coupled to the clutch member 32.

For the purpose of receiving the surplus that is removed from the load-receiver during the load-reducing period any suitable means can be employed, but I have herein represented for this purpose the conduit 88, which forms one branch of the duplex discharge-hopper H', the latter being situated below the load-receiver and being suitably secured within the base or bed 2. The main conduit 89 of the duplex hopper is intended to receive the true load or residue that is in the load-receiver after the surplus has been removed therefrom. The surplus which constitutes the overload, it will be remembered, is removed from the load-receiver and delivered into the conduit or branch 88 of the duplex hopper H', from whence it may be conducted to the supply-hopper H by means (not shown) such as illustrated in the Letters Patent hereinbefore referred to.

A shiftably-mounted deflector or valve is represented at 90, situated within the duplex hopper H' and operable to control or govern the passage of material into the respective branches of the duplex hopper, said deflector-valve being preferably connected with the clutch-actuator A' for operation. The valve 90 consists of a flat plate having at each end thereof projecting pivots, as 91, which work in suitable lugs or ears, as 92, on the inside of the duplex hopper, said valve normally occupying a position substantially in vertical alinement with the inside wall of the duplex hopper. Said valve has suitably affixed thereto the downwardly-extending crank-arm 93, to which is pivoted the connecting-rod 94, said rod being similarly attached to the arm 73 of the clutch-actuator A'. When the lower arm of the clutch-actuator A' is swung to the left to couple the clutch members 68 and 66, respectively, to thereby start the conveyer C, the rod 94, and consequently the crank-arm 93, will be similarly oscillated, thereby rocking the valve 90 to the left until its upper end reaches a position some distance back of the delivery end of the conveyer C, the latter in the interim having been started, whereby the material which is removed slowly from the load-receiver will strike against said valve and will rebound or be deflected into the conduit 88. When the clutch members 68 and 66 are uncoupled at the close of the load-reducing period, the arm 73 having been swung to the right to effect this result, said arm will continue said action until the coupling of the clutch members 69 and 67 is effected, thereby again throwing the conveyer into action. As the arm 73 thus acts the rod 94 and crank-arm 93 will be moved therewith, thereby oppositely rocking the valve 90 until it abuts against the oblique face 90' around the inlet of the conduit 88, it being at this time under the angular rib 90'' and closing the said inlet. This being the case and the conveyer C being driven at its high speed said conveyer will rapidly remove the contents from the load-receiver and deliver them against the valve 90, which deflects them into the main branch 89 of the discharge-hopper, as represented in Fig. 4.

In connection with the load-discharging means a shiftable regulator is provided, it being pivotally supported in some suitable manner above the discharge-hopper H' and within the supporting base or bed 2, said regulator being designated by R and consisting of a preferably flat plate, the lower deflected edge 95 of which is normally situated adjacent to the front inclined wall of the main branch 89 of the discharge-hopper H'', as indicated in Figs. 2 and 3. Said regulator R is positioned to be acted upon by the discharging-load when the valve 90 is thrown to a position to close the conduit 88, as shown in Fig. 4. When the true load is removed from the load-receiver G by the conveyer C, it will be delivered against the deflector 90, and from thence will rebound to the regulator R, forcing the latter to one side or to what is herein represented as the "right."

In connection with the regulator R and the deflector 90 a pair of reciprocally-effective interlocking stops or segments 96 and 97 are provided, each being adapted to block the action of the other. The interlocking stop 96 by blocking the action of its companion 97 will, it is evident, hold the deflector 90 in its closed position and will also maintain the members of the clutch L' in engagement, whereby the complete emptying of the load-receiver will be assured. The interlocking stops 96 and 97 are suitably fixed to the members R and 90, and the working or stop faces thereof, which are curved, are concentric with the axes of movement of said parts.

The operation of the two interlocking stops is clearly illustrated in Figs. 3 and 4. In Fig. 3 the stop 96 is represented in contact with the curved face of the stop 97, whereby downward movement of the former will be prevented by the latter. When, however, the valve 90 closes the inlet of the conduit 88, the stop 97 will be carried across the plane of the curved face of the stop 96, and the load being discharged at this time will be delivered against the valve 90 and will rebound and strike the regulator R, thereby forcing the latter to the right and pulling the stop 96 downward and across the plane of the curved face of the stop 97 and substantially in contact with said stop, whereby return movement thereof is prevented until the complete load has passed below the discharge end or deflected portion 95 of the regulator R. It is obvious that on the discharge of the load the weights W and W' will drop, and that the latch 40 will be tripped by the pin 85' on the weight W' to release the actuator A. The interlocking stop 96 has pivoted thereto the connecting-rod 98, having the loop 99 at its upper end, which embraces the pin 100 on the arm 37 of the actuator A. It will be evident that when the regulator R is shifted by the discharging load the rod 98 will be pulled downward until the upper end of the loop 99 reaches the pin 100, so that when the regulator R is shifted, as described, the return movement of the actuator A by the weight 36 is prevented. It will be also apparent that when the stop 96 blocks the action of its companion 97 the members of the clutch L' will be held in engagement by reason of the connections between the stop 97 and the clutch-actuator A. When, however, all the material has passed below the regulator R, the latter will be released and the weight 36 can drop to return the actuator A to its normal position to again couple the members of the clutch C'. As the actuator thus moves the interlocking-stop 96 will be raised by the actuator-arm 37 and rod 98 to carry the stop 96 above the coöperating stop 97, succeeding which operation the head 77 on the pendent bar or stop 76 descends between the branches of the upper arm 79 of the actuator A' to center the slidable members 68 and 69 of the two load-discharging clutches.

The operation of the hereinbefore-described machine, briefly, is as follows: Fig. 2 represents the positions occupied by the respective parts at the commencement of operation, the conveyer C being at rest and the clutch members 31 and 32 being in engagement with the shaft 25, rotating in the direction of the arrow in said figure. The carrier F will be operated through the meshing-worm 29 and worm-gear 28 to conduct from the hopper H a stream of relatively large volume, which is delivered into the load-receiver. When a certain portion of the load is received by the load-receiver, it and the beam mechanism will descend, the carrier continuing to conduct the supply to the load-receiver until the projection or finger 38 on the beam B impinges against the arm 37 of the clutch-actuator A. This action takes place at about the time the load-receiver is overloaded or has passed below the so-called "poising-line." When the projection 38 depresses the arm 37, the arm 34 of the actuator A will be swung to the left, as shown in Fig. 3, to disengage the clutch member 31 from the fixed clutch member 32, to thereby stop the carrier F, and the arm 39 of said actuator will be then engaged by the latch 40 to prevent immediate retractive movement of said actuator, and hence the recoupling of the two clutch members. When the actuator is shifted, as just described, its counterweighted arm 35 will lift the pendent bar or stop 76 to release the actuator A'. At about the time the load-receiver has reached the limit of its downward movement the projection 80 will abut against and raise the counterweighted arm 74 of the clutch-actuator A', as represented in Fig. 3, to thereby couple the clutch members 68 and 66, whereby the conveyer C will be driven at a slow speed by the pulley 69' and the shaft 25, acting through the driver D and worms 58 and 59. On the movement of the conveyer C it will conduct a body of material from the load-receiver G and will discharge into the branch conduit 88 of the discharge-hopper H', the valve 90 of the latter having previously been thrown to its wide-open position, as hereinbefore described. When the actuator A' is shifted to couple the clutch members 68 and 66, the latch-arm 82 will engage the shoulder 83 of the said actuator to hold the same against immediate return movement. As the load-receiver lightens it will be caused to rise by the dropping of the two weights W and W', and at about the time the true load is in said receiver the projection 81 will abut against the by-pass 85 and will swing the notched arm 82 of the latch to the right to disengage it from the actuator-arm 74, so that the latter can drop, which results in throwing the clutch members 69 and 67 into engagement, the actuator A' as it swings shifting the valve 90 to close the inlet of the conduit 88.

When the two clutch members 67 and 69 are coupled, the conveyer C will be driven at its high speed by the pulley 70 and belt 72 and pulley D to rapidly remove the predetermined or measured load from the load-receiver, which is discharged against the valve 90 and, rebounding, strikes the regulator R to shift the same from the position shown in Fig. 3 to that indicated in Fig. 4. When the weight W' has nearly arrived at its normal position, the pin 85' will pull the link 87 and the working arm of the latch 40 downward, thereby releasing the actuator A, which can be returned to its normal position when the regulator R is released. The regulator R will be released when all the material discharged from the load-receiver G has passed below its discharge edge, at which time the counter-weighted arm 35 of the actuator A can drop to couple the clutch members 31 and 32 to again start the feed-carrier F.

Having described my invention, I claim—

1. The combination of weighing mechanism embodying a load-receiver; a supply-conveyer; a discharge-conveyer mounted on the load-receiver; and mechanism for driving the supply-conveyer to furnish the load-receiver with an overload, and then for stopping the supply-conveyer and for subsequently operating the discharge-conveyer in different directions, first, to remove the surplus, and then to remove the predetermined load.

2. The combination, with weighing mechanism including a load-receiver, of a carrier in position to deliver an overload to said load-receiver; a continuously-operative shaft; means controlled by the weighing mechanism, for coupling said shaft to and uncoupling it from the carrier; a conveyer mounted on the load-receiver; a shaft connected to said conveyer; two drivers mounted on said last-mentioned shaft and connected with the continuously-operative shaft; and means operative with the weighing mechanism, for successively coupling said drivers to their shaft on the stoppage of the carrier.

3. The combination, with weighing mechanism including a load-receiver, of a carrier in position for conducting a supply of material to the load-receiver for overloading the same; a continuously-operative shaft; gearing located between said shaft and the carrier, one of the members of the gearing being supported on said shaft; means operated by the weighing mechanism, for coupling said gear member to and uncoupling it from its supporting-shaft; a conveyer mounted on the load-receiver; pulleys secured to the continuously-operating shaft; a second shaft connected with said conveyer and having pulleys loose thereon and connected by belting with the first-mentioned pulleys; and means controlled by the weighing mechanism, for successively coupling said loose pulleys to their supporting-shaft when the gear member is uncoupled from its shaft.

4. The combination, with a load-receiver, of beam mechanism therefor; a carrier; driving mechanism for said carrier, embodying a clutch; a clutch-actuator; means operative with the beam mechanism, for shifting said clutch-actuator; a latch operative to engage and hold said clutch-actuator when shifted; and latch-tripping means also operative with the beam mechanism.

5. The combination, with a load-receiver, of beam mechanism therefor; a carrier; driving mechanism for said carrier, embodying a clutch; a self-operative clutch-actuator; means operative with the beam mechanism, for shifting said clutch-actuator in one direction; a latch located to engage and to hold said clutch-actuator when shifted; and latch-tripping means also operative with the beam mechanism.

6. The combination, with a load-receiver, of a pair of scale-beams therefor; a carrier; driving mechanism for said carrier, embodying a clutch; a clutch-actuator; means operative with one of said beams, for shifting said clutch-actuator; a latch located to engage said clutch-actuator when shifted; and means operative with the other beam, for tripping said latch.

7. The combination, with a load-receiver, of a pair of scale-beams therefor; a carrier; driving means for said carrier, embodying a clutch; a lever constituting an actuator for said clutch; a projection on one of the scale-beams, for engaging one of the arms of said lever to shift the same; a latch located to engage said lever when shifted; and connections between said latch and the other scale-beam.

8. The combination, with a load-receiver, of a pair of scale-beams therefor; a carrier; driving mechanism for said carrier, embodying a clutch; a lever constituting an actuator for said clutch; a projection on one of the scale-beams, adapted to engage one of the arms of said lever at a predetermined point to shift the same; a latch located to engage said lever when shifted; and a link connected to said latch and having a loop at one end, which embraces a pin on the other scale-beam.

9. The combination, with a load-receiver, of a pair of supporting scale-beams therefor, one of which has a projection, and the other of which is provided with a pin; a carrier; driving mechanism for said carrier, embodying a clutch; a compound counterweighted lever constituting an actuator for said clutch, one of the arms of which is disposed in the path of movement of said projection; a latch pivoted to the framework and adapted to engage said compound lever at a predetermined point; a link pivoted to said latch and having a loop at its lower end, which embraces said pin.

10. The combination, with weighing mechanism including a load-receiver, of overloading means operable for delivering to said load-receiver a supply of material in excess of the predetermined load; a conveyer mounted on the load-receiver and having two distinct stages of operation, on the first of which it is adapted to remove the surplus from the load-receiver, the residue constituting the true load, and on the second of which it is adapted for removing said load; and driving mechanism for said conveyer.

11. The combination, with weighing mechanism including a load-receiver, of a conveyer mounted on said load-receiver; two drivers for said conveyer; and means for successively throwing said drivers into operative relation with the conveyer.

12. The combination, with weighing mechanism having load-reducing and load-discharging periods and including a load-receiver, of a conveyer mounted on said load-receiver; and driving mechanism for operating said conveyer at different speeds, respectively, during the load-reducing and load-discharging periods.

13. The combination, with weighing mechanism having load-reducing and load-discharging periods and including a load-receiver, of a conveyer mounted on said load-receiver; and driving mechanism for operating said conveyer at fast and slow speeds during the load-reducing and load-discharging periods, respectively.

14. The combination, with weighing mechanism including a load-receiver, of a conveyer mounted on said load-receiver; a shaft connected with said load-receiver and supporting two loose differential pulleys thereon; means for driving said pulleys; and instrumentalities for successively coupling said pulleys to their supporting-shaft.

15. The combination, with weighing mechanism including a load-receiver, of overloading means; a combined load-reducing and load-discharging conveyer mounted on the load-receiver; driving mechanism for operating said conveyer; and a duplex hopper, the respective branches of which are situated to receive material removed from the load-receiver by said conveyer.

16. The combination, with weighing mechanism including a load-receiver, of overloading means; a combined load-reducing and load-discharging conveyer mounted on the load-receiver; driving mechanism for operating said conveyer; a duplex hopper situated to receive material removed from the load-receiver by said conveyer; and means for controlling the passage of material into the branches of the duplex hopper.

17. The combination, with weighing mechanism embodying a load-receiver, of overloading means therefor; a combined load-reducing and load-removing conveyer mounted on the load-receiver; driving mechanism for said conveyer; a duplex hopper the branches of which are situated to receive material removed from the load-receiver by said conveyer; and a shiftably-supported deflector adapted to control the passage of material from said branches and governed by the driving mechanism.

18. The combination, with weighing mechanism including a load-receiver; of a carrier and its driving mechanism, embodying a clutch; a clutch-actuator; a conveyer mounted on the load-receiver; driving mechanism for said conveyer, embodying a clutch; and a stop normally adapted for holding the last-mentioned clutch-actuator against movement and connected with the first-mentioned clutch-actuator.

19. The combination, with weighing mechanism including a load-receiver, of a carrier; driving mechanism for said carrier, embodying a clutch; a clutch-actuator having a pendent bar connected therewith and also with the framework; a conveyer mounted on the load-receiver; driving mechanism for said conveyer, embodying a clutch; and a clutch-actuator having a portion thereof bifurcated, said bifurcated portion being coöperative with the pendent bar.

20. The combination, with weighing mechanism including a load-receiver, of a carrier; driving mechanism for said carrier, embodying a clutch; a clutch-actuator having a pendent bar connected therewith and also with the framework by a link, the head of said bar being wedge-shaped; a conveyer mounted on the load-receiver; driving mechanism for said conveyer, embodying a clutch; and a clutch-actuator having a portion thereof bifurcated, said bifurcated portion being coöperative with the wedge-shaped head of said pendent bar.

21. The combination, with weighing mechanism including a load-receiver, of a conveyer mounted on the load-receiver; driving mechanism for said conveyer, embodying a clutch; a clutch-actuator; means operative with the weighing mechanism, to shift said clutch-actuator; and a latch adapted to engage said clutch-actuator when shifted.

22. The combination, with weighing mechanism including a load-receiver, of a conveyer mounted on said load-receiver; a shaft having two drivers thereon; an actuator coöperative with said drivers; means operative with the weighing mechanism, for shifting said actuator; and a latch adapted to engage said actuator when shifted.

23. The combination, with a load-receiver, of a scale-beam therefor; a conveyer mounted on the load-receiver; driving mechanism for said conveyer, having two clutches constituting a part thereof; drivers connected with the movable clutch members; a clutch-actuator; means for engaging said clutch-actuator, to shift it in one direction; a latch operative for engaging said actuator when shifted; and latch-tripping means operated by said beam, whereby the clutch-actuator is released.

24. The combination, with a load-receiver and with supporting-beam mechanism therefor, of a carrier; driving mechanism for said carrier, embodying a clutch; a clutch-actuator; a conveyer mounted on the load-receiver; driving mechanism for said conveyer, embodying two clutches, the movable members of which are located intermediate the two fixed members thereof; and means for simultaneously centering said movable clutch members, said centering means being operative with the clutch-actuator.

25. The combination, with weighing mechanism embodying a load-receiver, of a conveyer mounted on said load-receiver; driving mechanism for said conveyer; an actuator cooperative with one of the drivers of said driving mechanism; a duplex hopper; a valve for regulating the passage of material into the branches of said hopper; and connections between said valve and actuator.

26. The combination, with weighing mechanism embodying a load-receiver; of a duplex hopper, the respective branches of which are situated to remove material discharged from the load-receiver; a valve controlling the passage of material to said branches; a regulator positioned to be acted upon by the load discharged from the load-receiver; and means operative with said regulator, for blocking the action of said valve.

27. The combination, with weighing mechanism including a load-receiver, of a conveyer mounted on said load-receiver; a duplex hopper, the branches of which are situated to receive material removed from said load-receiver by the conveyer; a regulator located to be acted upon by the load discharged from said load-receiver; and means operative with said regulator, for blocking the action of said valve.

28. The combination, with weighing mechanism including a load-receiver, of a conveyer mounted on said load-receiver; a driver for said conveyer; an actuator operative for throwing the driver into operative connection with said conveyer; a duplex hopper, the branches of which are situated to receive material removed from the load-receiver by said conveyer; a valve controlling the passage of material into said branches and connected with said actuator; a regulator located to be acted upon by the material discharged from the load-receiver; and means operative with said regulator, for blocking the action of said valve.

FRANCIS H. RICHARDS.

Witnesses:
FRED. J. DOLE.
F. N. CHASE.